United States Patent
Brzezniak et al.

(10) Patent No.: US 6,634,285 B2
(45) Date of Patent: Oct. 21, 2003

(54) BEARING SYSTEM FOR A SLIDE ELEMENT ON A PRESS

(75) Inventors: Edward J. Brzezniak, Orland Park, IL (US); Matthew S. Peksa, Lockport, IL (US); James Washington, Bellwood, IL (US)

(73) Assignee: Aida Engineering, Ltd., Kanagawa (JP)

( * ) Notice: Subject to any disclaimer, the term of this patent is extended or adjusted under 35 U.S.C. 154(b) by 0 days.

(21) Appl. No.: 10/002,731

(22) Filed: Nov. 15, 2001

(65) Prior Publication Data

US 2003/0089250 A1 May 15, 2003

(51) Int. Cl.[7] .............................. B30B 1/42; B30B 1/32; F16C 19/00
(52) U.S. Cl. ..................... 100/214; 100/269.17; 384/50
(58) Field of Search .......................... 100/214, 269.17; 384/50, 53, 57, 58; 72/456

(56) References Cited

U.S. PATENT DOCUMENTS

| | | | | |
|---|---|---|---|---|
| 2,230,288 A | * | 2/1941 | Dinzl | 100/214 |
| 2,581,022 A | * | 1/1952 | Japikse | 100/214 |
| 2,755,147 A | * | 7/1956 | Ernst | 100/214 |
| 3,377,111 A | | 4/1968 | Brault | |
| 3,389,625 A | * | 6/1968 | Wagner | 384/44 |
| 4,182,205 A | | 1/1980 | Baker | |
| 5,161,926 A | * | 11/1992 | Schulz | 384/53 |
| 5,230,567 A | | 7/1993 | Takeuchi | |
| 5,775,212 A | * | 7/1998 | Takao | 100/214 |

* cited by examiner

Primary Examiner—Allen Ostrager
Assistant Examiner—Jimmy T Nguyen
(74) Attorney, Agent, or Firm—Wood, Phillips, Katz, Clark & Mortimer (57) ABSTRACT

A press system having at least one elongate column. A slide element is guided by the at least one column between a retracted position and an extended position. A first guide assembly acts between the slide element and the one column. The first guide assembly has a) a first bearing assembly consisting of a first bearing housing on one of the slide element and one column, a first carrier that is guidingly movable relative to the first bearing housing, and a first roller element that is movable guidingly relative to the first carrier and acts against a first surface on the other of the slide element and the one column to guide movement between the slide element and frame as the slide element is moved between the retracted and extended positions, and b) a second bearing assembly consisting of a second bearing housing on one of the slide element and the one column, a second carrier that is guidingly movable relative to the second bearing housing, and a second roller element that is movable guidingly relative to the second carrier and acts against a second surface that is i) on the slide element in the event that the second bearing housing is on the frame and ii) on the frame in the event that the second bearing housing is on the slide element.

23 Claims, 9 Drawing Sheets

BEARING SYSTEM FOR A SLIDE ELEMENT ON A PRESS

BACKGROUND OF THE INVENTION

1. Field of the Invention

This invention relates to presses of the type having a frame and a slide element which is movable guidingly relative to the frame and, more particularly, to a bearing assembly that guides movement between the slide element and frame.

2. Background Art

There are many environments in which elements are translated guidingly, one relative to the other. As one example, presses utilize a slide element that is movable guidingly relative to a frame between extended and retracted positions. In one such press construction, the frame has a plurality of elongate, vertically extending columns which cooperate with the slide element to guide movement thereof. This type of press may utilize either flat surface-to-surface contact between the slide element and frame or roller elements that are each engageable with a cooperating surface on the frame to roll there against as the slide element is moved between the retracted and extended positions.

These conventional systems are effective generally so long as exact alignment between the frame and slide element is maintained. However, in the event that the slide element becomes skewed, either because of misalignment of supporting parts and/or because of the application of an uneven force on the slide element during use, the slide element may bind within the frame. This potentially has a number of deleterious effects. The skewed slide element may not move smoothly relative to the frame. Over time, guiding elements acting between the frame and/or slide element may suffer significant damage. In a worst case, the skewing could be extreme enough that the press malfunctions.

To address the above condition, frequent maintenance may have to be implemented to keep the press operational. In the event of a malfunction, the press might have to be shut down and repaired. This may have a significant economic impact on a business, particularly when the press is an integrated component of an overall machining system that coordinates the press operation with processing performed by a number of other machining components.

Many systems have been devised to facilitate smooth relative translational movement between press elements. As one example, U.S. Pat. No. 3,389,625 (Wagner) discloses a roller carrying element on a frame, which element can be adjustably cammed so as to control clearance between roller elements thereon and a cooperating, translating slide element. It appears that in both of Wagner's embodiments, the orientation of the pivot axes for the roller elements can vary relative to a truncated, cylindrical camming element, which is repositioned so as to press the roller elements toward the slide element. This reorientation of the roller elements during operation of the system could impair the intended smooth guiding function of the roller elements.

It also appears that Wagner's structure would be prone to skewing by shifting of the slide element out of the plane of the paper, as seen from the FIG. 2 perspective. The roller elements acting against the side edges of the slide element are responsible for preventing skewing in two orthogonal planes. In a high load environment, it would be difficult, if not impossible, to construct a system of this type that would effectively control skewing in orthogonal planes by reason of using only the opposing relationship on the side edges, as depicted in Wagner.

The press industry, and other industries, are constantly seeking ways to smoothly and positively guide relative translatory movement between cooperating elements.

SUMMARY OF THE INVENTION

In one form, the invention is directed to a press system having at least one elongate column. A slide element is guided by the at least one column between a retracted position and an extended position. A first guide assembly acts between the slide element and the one column. The first guide assembly has a) a first bearing assembly consisting of a first bearing housing on one of the slide element and one column, a first carrier that is guidingly movable relative to the first bearing housing, and a first roller element that is movable guidingly relative to the first carrier and acts against a first surface on the other of the slide element and the one column to guide movement between the slide element and frame as the slide element is moved between the retracted and extended positions, and b) a second bearing assembly consisting of a second bearing housing on one of the slide element and the one column, a second carrier that is guidingly movable relative to the second bearing housing, and a second roller element that is movable guidingly relative to the second carrier and acts against a second surface that is i) on the slide element in the event that the second bearing housing is on the frame and ii) on the frame in the event that the second bearing housing is on the slide element.

In one form, the first and second surfaces are transverse to each other.

The first carrier may be guidingly movable relative to the first bearing housing around a first axis.

The second carrier may be guidingly movable relative to the second bearing housing around a second axis that is transverse to the first axis.

In one form, the first and second axes are substantial orthogonal to each other.

In one form, there is at least one roller element on the first bearing assembly in addition to the first roller element that is movable guidingly relative to the first carrier and acts against the first surface to guide movement of the slide element as it is moved between the retracted and extended positions.

The press element may be movable in a first substantially straight line between the extended and retracted positions. The first and second axes may be substantially orthogonal to the first straight line.

In one form, the first roller element is movable relative to the first carrier around an axis that is substantially fixed relative to the first carrier.

In one form, the frame has three elongate columns in addition to the one elongate column and there is a guide assembly, the same as the first guide assembly, acting between the slide element and each of the three columns in addition to the one column.

In one form, there is a second guide assembly, the same as the first guide assembly, acting between the slide element and the one column.

The invention is also directed to a press system having a frame, a slide element that is guided by the frame between a retracted position and an extended position, and a first bearing assembly acting between the slide element and the frame. The first bearing assembly has a first bearing housing on one of the slide element and the frame, a first carrier that is connected to the first bearing housing for pivoting movement relative to the first bearing housing around a substantially fixed first axis, and a first roller element that is connected to the first carrier for pivoting movement relative to the first carrier around a second substantially fixed axis and acts against a first surface on the other of the slide element and the frame to guide movement between the slide element and frame as the slide element is moved between retracted and extended positions.

In one form, the first carrier has an arcuate, concave surface which guides the first bearing housing in pivoting movement around the first axis.

The first bearing housing may be fixedly attached to the one of the slide element and frame.

The system may further include a first mounting block releasably attached to the one of the slide element and frame. The first bearing housing is attached to the first mounting block so that the first bearing housing can be adjusted and maintained in a desired position relative to the first mounting block.

The press system may further include a second bearing assembly, that is the same as the first bearing assembly, and having a second bearing housing. The press system may further have a second mounting block that is in a fixed position on the one of the slide element and frame, with the second bearing housing being attached to the second mounting block so that the second bearing housing can be adjusted and maintained in a desired position relative to the second mounting block.

The slide element may have first and second transverse surfaces. In one form, the first mounting block is attached to the first transverse surface with the second mounting block attached to the second transverse surface.

The invention is further directed to a bearing assembly for acting between a slide element and another element to guide movement of the slide element and another element between first and second relative positions. The bearing assembly has a first bearing housing for attachment to one of the slide element and the another element, a first carrier that is connected to the first bearing housing for pivoting movement relative to the first bearing housing around a substantially fixed first axis, and a first roller element that is connected to the first carrier for pivoting movement relative to the first carrier around a second fixed axis and acting against a surface on the other of the slide element and another element to guide movement between the first and second relative positions.

In one form, the first carrier has an arcuate, concave surface which guides the first bearing housing in pivoting movement around the first axis.

The invention is further directed to a method of guiding relative movement between a slide element and a frame having at least three elongate columns which are located around a space within which the slide element is movable between an extended position and a retracted position. The method includes the steps of: providing a plurality of bearing assemblies that cooperate one each between the slide element and each elongate column; and rotating a roller element on each bearing assembly around an axis and against one of a) the slide elements and b) one of the columns to guide relative movement between the slide element and frame as the slide element moves between the extended and retracted positions.

The method may further include the steps of varying the orientation of the axes of the roller elements relative to the one of a) the slide element and b) one of the columns to accommodate skewing of the slide element as the slide element is moved between the extended and retracted positions.

DETAILED DESCRIPTION OF THE DRAWINGS

Figure 1:
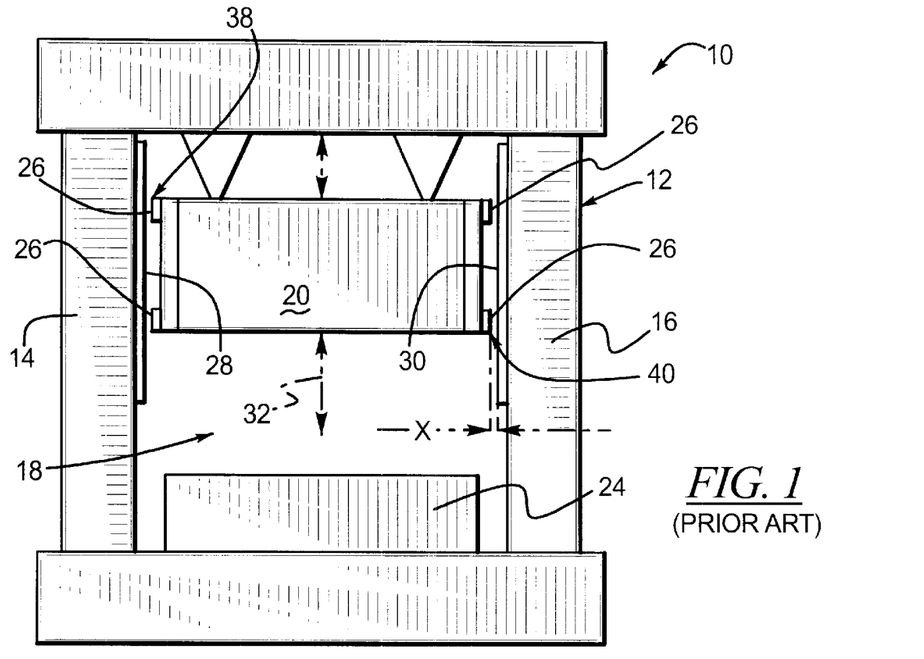
FIG. 1 is a schematic, front elevation view of a conventional press system with a slide element in a retracted position and having lubricated gib elements to guide movement of the slide element relative to a frame.
Figure 2:
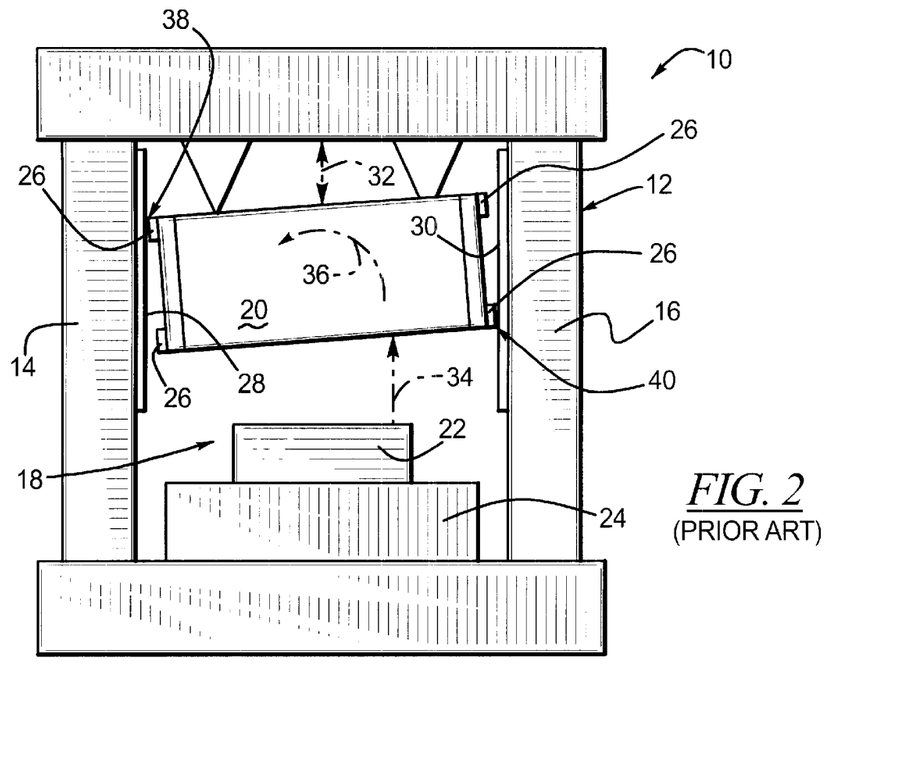
FIG. 2 is a view as in FIG. 1 wherein the slide element is shown skewed upon encountering an off center load.

In FIGS. 1 and 2, a conventional press system is shown at 10 consisting of a frame 12 having a plurality of vertically extending, spaced, elongate columns 14, 16. The columns 14, 16 bound an operating space 18 within which a slide element 20 is operated. The slide element 20 is movable from a retracted/raised position, shown in FIG. 1, towards an extended/lowered position, as shown in FIG. 2. By lowering the slide element 20, the slide element 20 is caused to exert a pressing force on a workpiece 22 on a support 24 associated with the frame 12.

The slide element 20 is guided in vertical movement by the columns 14, 16. While two columns 14, 16 are shown, typically four such columns 14, 16 define the frame 12 and bound a generally squared operating space 18 within which the slide element 20 moves. The slide element 20 has associated gibs 26 which are dimensioned so that a slight clearance space X is maintained between the gibs 26 and adjacent slide surfaces 28, 30 on the columns 14, 16.

As the slide element 20 is lowered/extended, the slide element 20 and frame 12 are ideally aligned so that the spacing X is maintained between the gibs 26 and slide surfaces 28, 30 on the columns 14, 16 as the slide element 20 moves through its full range of movement in a vertical line, as indicated by the double-headed arrows 32, i.e. parallel to the planes of the slide surfaces 28, 30. In the event of a slight shifting of the slide element movement from vertical, or in the event that there are dimensional variations between parts, the gibs 26 may contact the slide surfaces 28, 30 so that the slide element 20 moves guidingly against and relative to the frame 12. The gibs 26 may be laden with lubricant so as to minimize frictional forces between the gibs 26 and the frame 12.

As shown in FIG. 2, in the event that the slide element 20 is lowered against a workpiece 22 so that an off center load, as indicated by the arrow 34, is applied, the slide element 20 tends to skew, as by tipping in the direction of the arrow 36. This produces a wedging action between the diagonally opposite corners 38, 40 of the slide element 20 that may restrict or prevent further downward sliding movement of the slide element 20 and/or cause damage to one or both of the frame 12 and slide element 20.

Figure 3:
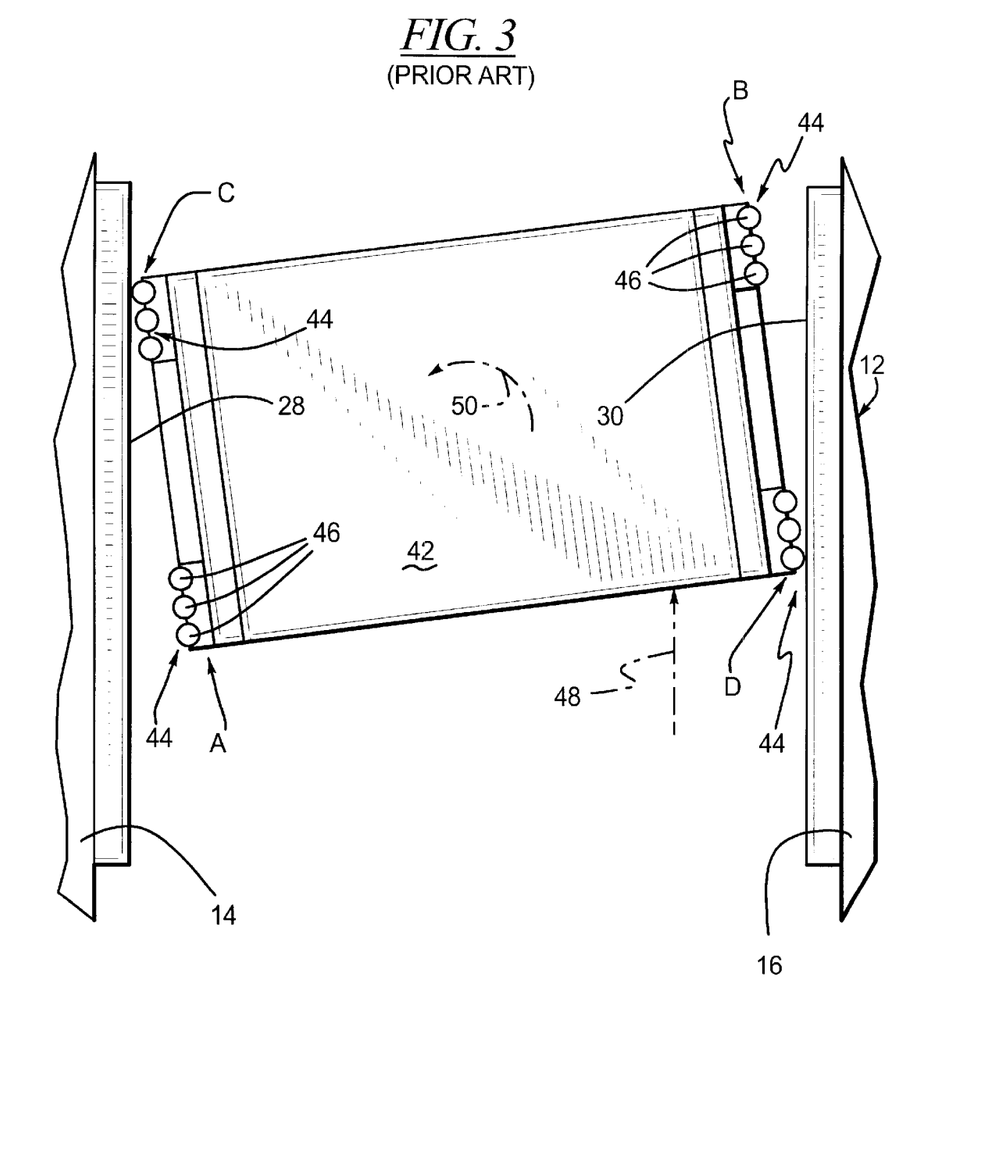
FIG. 3 is a view as in FIG. 2 wherein the skewed condition is shown with the slide element guided by conventional roller elements.

The same problem is prevalent in conventional presses that utilize a slide element 42 with roller assemblies 44, as shown in FIG. 3. The frame 12 shown in FIG. 3 is the same as shown in FIGS. 1 and 2. The primary difference is that the oil laden gibs 26 are replaced with the roller assemblies 44. Each roller assembly 44 has, in this construction, three roller elements 46 which are designed to simultaneously roll guidingly against the frame surfaces 28, 30 as the slide element 42 is extended and retracted.

In the event that an off center load is applied, as indicated by the arrow 48, the slide element 42 tends to skew, as indicated by the arrow 50. This action, depending upon the clearance of the roller assemblies 44 and columns 14, 16, may cause the roller assemblies 44 at locations, identified as A and B, to substantially separate from the frame 12. At the same time, the roller assemblies 44 at locations C and D reorient so that one or two of the roller elements 46 move away from the surfaces 28, 30 so that the entire loading force between the slide elements 42 and frame 12 is borne by a single roller element 46 on each roller assembly 44.

Again, this action potentially interferes with proper movement of the slide element 42 and in a worst case may cause lockup of the slide element 42 and/or damage to the roller assemblies 44 and/or the frame 12.

It should be understood that the drawings in FIGS. 1–3 are schematic in nature and that the skewing of the slide elements 20, 42 is exaggerated to demonstrate the problem with the prior art press systems.

Figure 4:
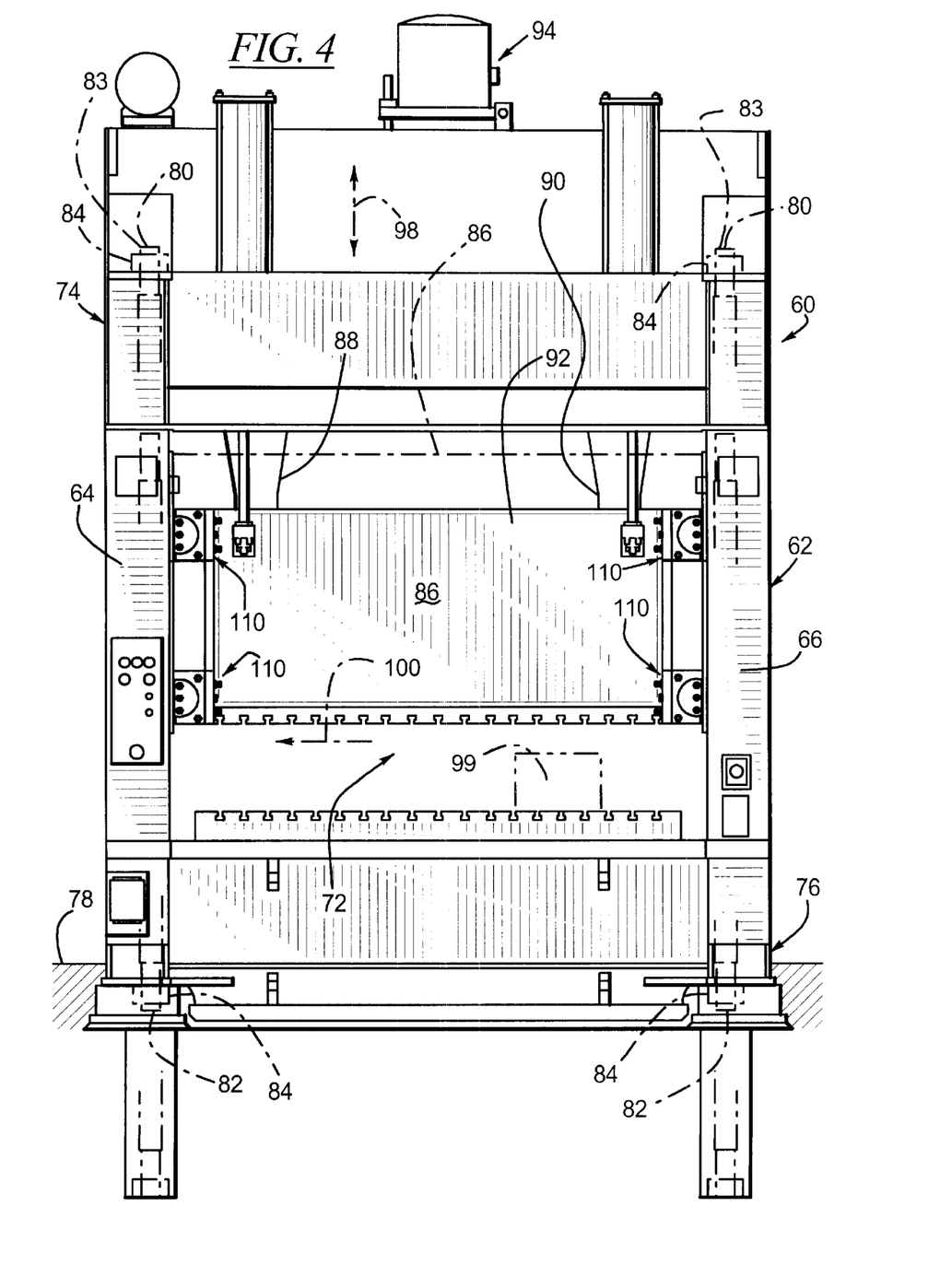
FIG. 4 is a front elevation view of a press system, with a slide element and guide assemblies, according to the present invention and each consisting of first and second bearing assemblies for guiding relative movement between the slide element and a frame.
Figure 5:
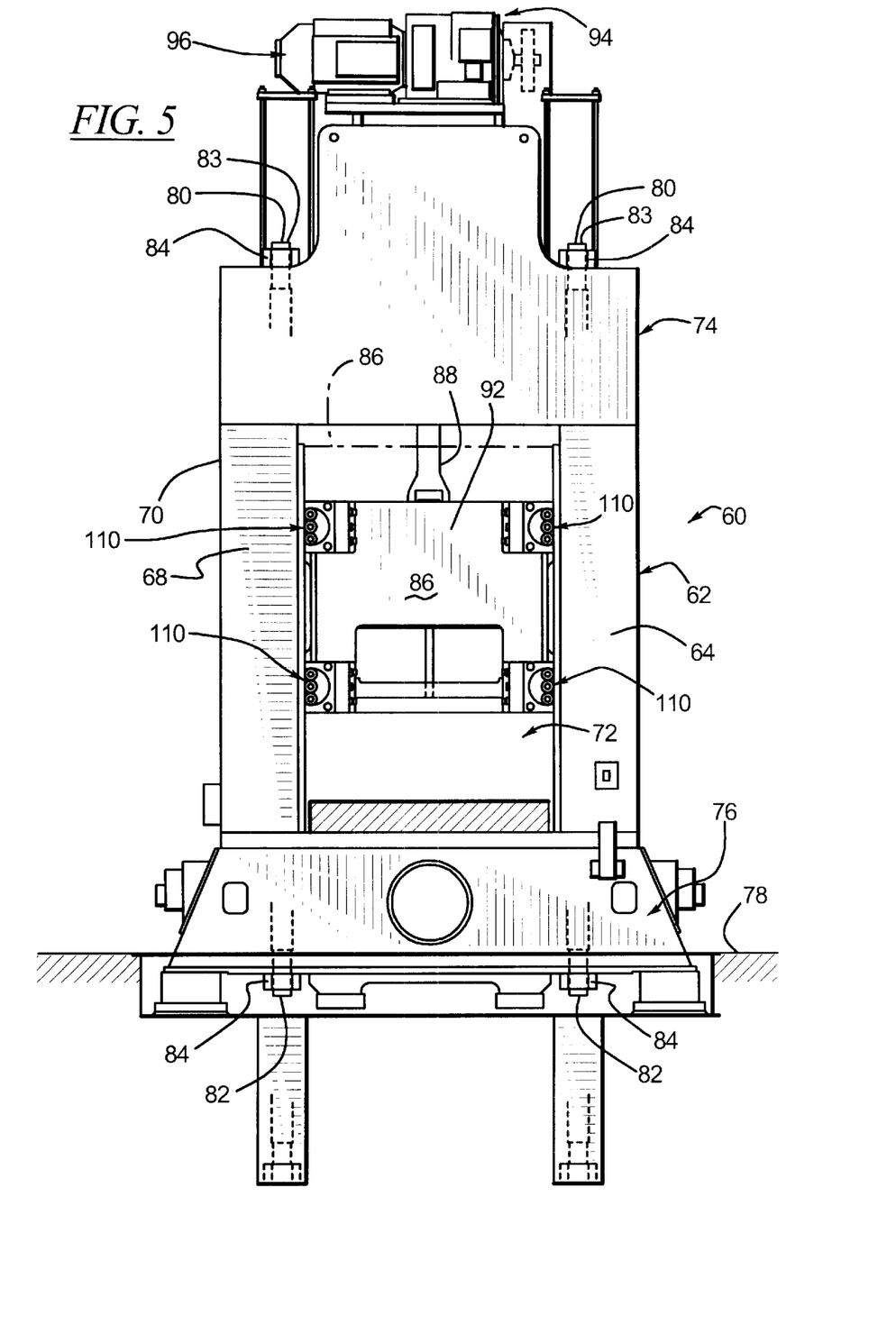
FIG. 5 is a side elevation view of the press system in FIG. 4.
Figure 6:
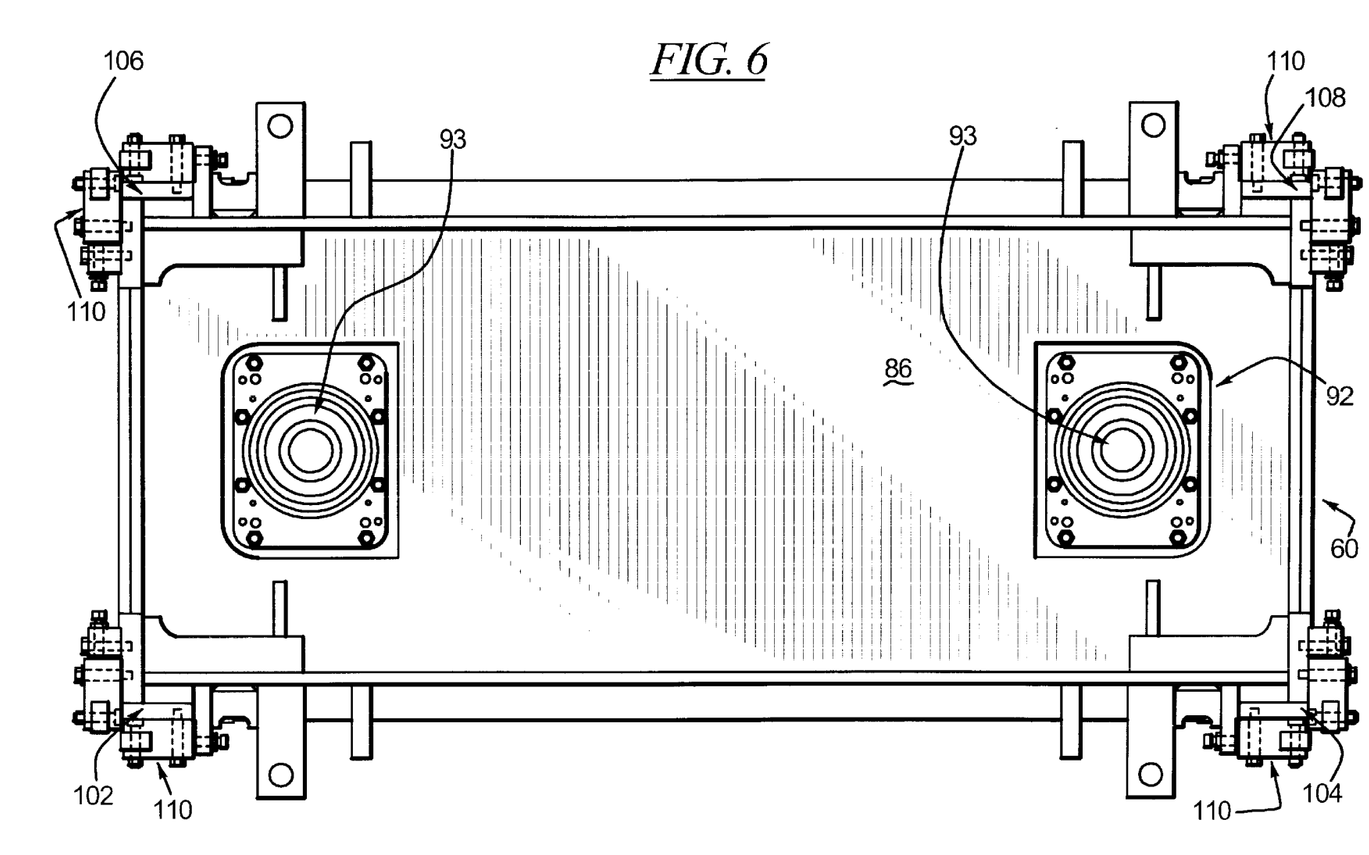
FIG. 6 is an enlarged, plan view of the slide element in FIGS. 4 and 5.

Referring now to FIGS. 4–6, a press system, according to the present invention, is shown at 60. The press system 60 has a frame 62 consisting of four vertically extending, elongate columns 64, 66, 68, 70 which bound a press operating space 72. The columns 64, 66, 68, 70 extend between an overhead crown assembly 74 and a bed assembly 76, with the latter being implanted in a support surface 78. The columns 64, 66, 68, 70, crown assembly 74, and bed assembly 76 are unified through tie rods 80, each extending through a column 64, 66, 68, 70, the crown assembly 74, and the bed assembly 76, so that opposite, threaded, rod ends 82, 83 are exposed at the bed assembly 76 and crown assembly 74, respectively, to accept a nut 84. By tightening the nuts 84, a unitary assembly with the columns 64, 66, 68, 70 captive between the crown assembly 74 and bed assembly 76 results.

A slide element 86 is suspended from the crown assembly 74 by, in this embodiment, two hanging rods 88, 90. The hanging rods, 88, 90 have lower ends (not shown), which are attached to the main body 92 of the slide element 86 at spaced locations 93 through connections thereat that permit guided, universal movement between the rod and the body 92.

The manner of vertically repositioning the slide element 86 is not important to the present invention. Virtually any known mechanism can be used to change the slide element 86 between the retracted/raised position, as shown in dotted lines in FIGS. 4 and 5, and extended/lowered position, shown in solid lines in FIGS. 4 and 5. In this embodiment, a lift system 94, operable through a motor 96, mounted atop the crown assembly 74, is utilized to selectively raise and lower the hanging rods 88, 90 so that the slide element 86 moves vertically up and down, as indicated by the double-headed arrow 98, between the extended and retracted positions therefor. Workpieces 99 can be serially directed from right to left into an operative position in the operating space 72, to allow the slide element 86 to perform an operation thereon. Once the operation is completed, the workpiece 99 can be appropriately directed further in the line of the arrow 100 out of the operating space 72.

The main body 92 of the slide element 86 has a rectangular shape nominally matched to the rectangular operating space 72 bounded by the columns 64, 66, 68, 70, as viewed in plan. The slide element 86 has four corners 102, 104, 106, 108, which, with the slide element 86 operatively associated with the frame 62, are situated, one each, adjacent to the columns 64, 66, 68, 70, consecutively.

To facilitate guided relative movement between the slide element 86 and columns 64, 66, 68, 70, guide assemblies 110 are utilized. In this embodiment, a separate guide assembly 110 is provided at the top and bottom of the slide element body 92 at each corner 102, 104, 106, 108. Each guide assembly 110 has the same construction and is mounted to the slide element body 92, and cooperates with the frame 62 in the same manner. The structure of the guide assembly 110 and the cooperation thereof between the slide element 86 and frame 62 will now be described for the representative guide assembly 110 at the corner 102 of the slide element 86 which cooperates with the column 64.

Referring now to FIGS. 7–14, in addition to FIGS. 4–6, the details of the guide assembly 110 are shown. The guide assembly 110 consists of first and second bearing assemblies 112, 114, each having the same construction and separately mounted to the slide element 86 at the corner 102. Exemplary bearing assembly 112 has a first bearing housing 116. The bearing housing 116 has an arcuate, concave guide surface 118 defined by a radius R1 from a center 120 of the arcuate surface 118. The surface 118 extends through an angle θ that is greater than 180°.

Figures 10, 11, 12:
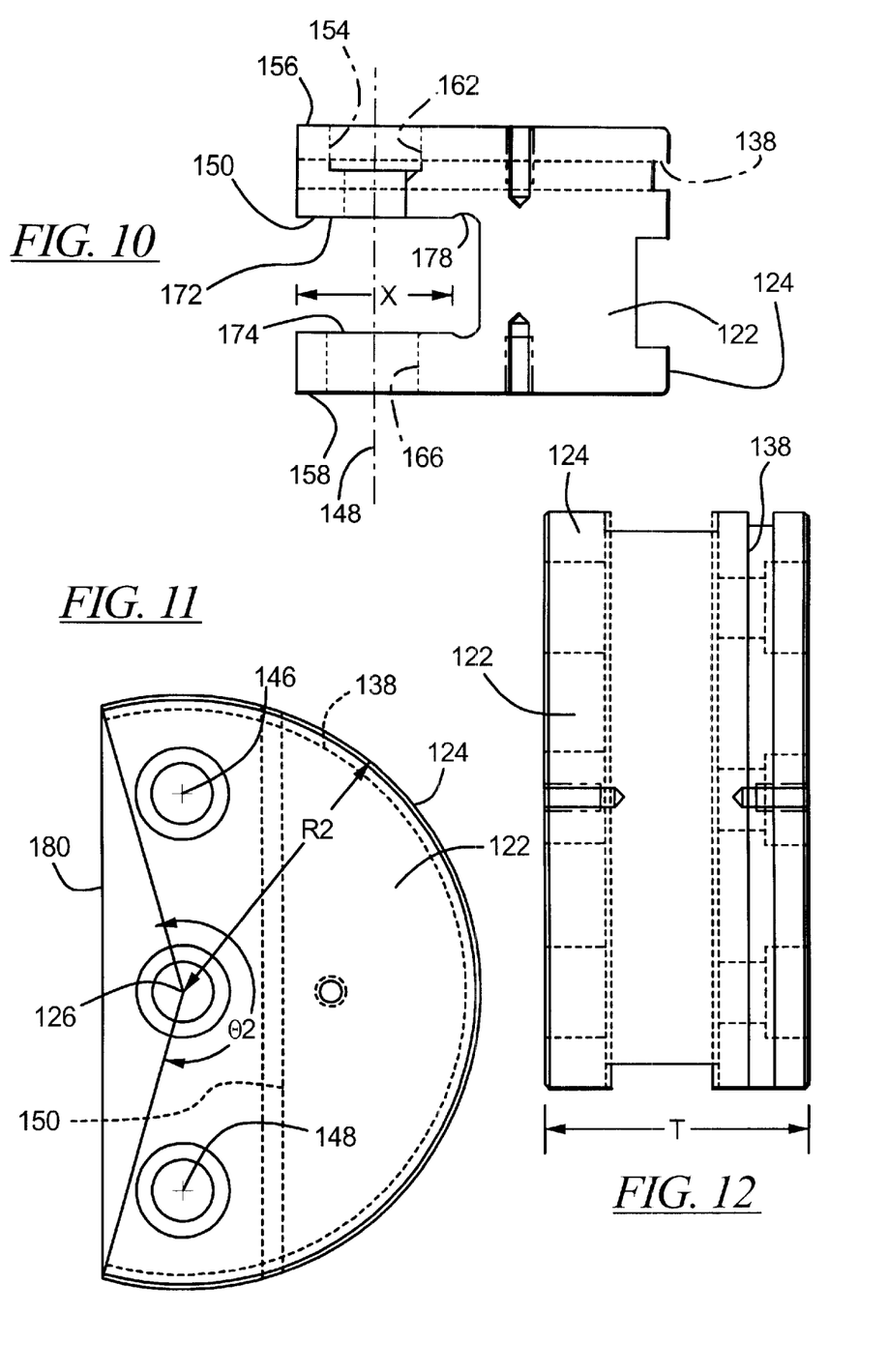
FIG. 10 is an enlarged, plan view of a carrier on the bearing assemblies in FIGS. 7–9.
FIG. 11 is an enlarged, front elevation view of the carrier in FIG. 10.
FIG. 12 is an enlarged, side elevation view of the carrier in FIGS. 10 and 11.
Figure 13:
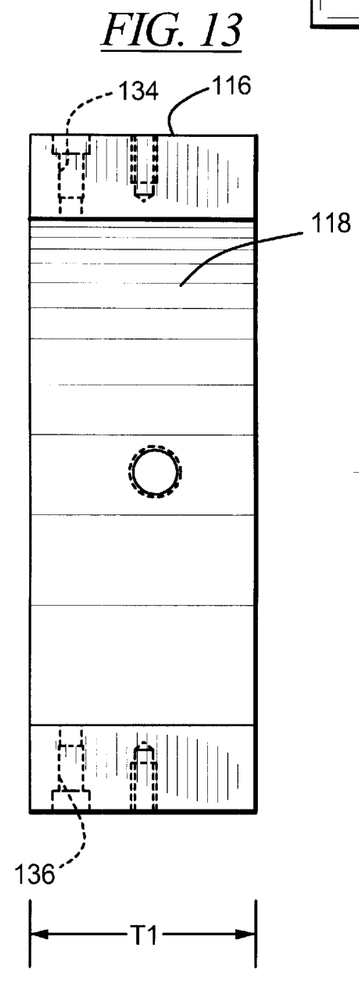
FIG. 13 is an enlarged, side elevation view of a bearing housing for receiving the carrier in FIGS. 10–12.
Figure 14:
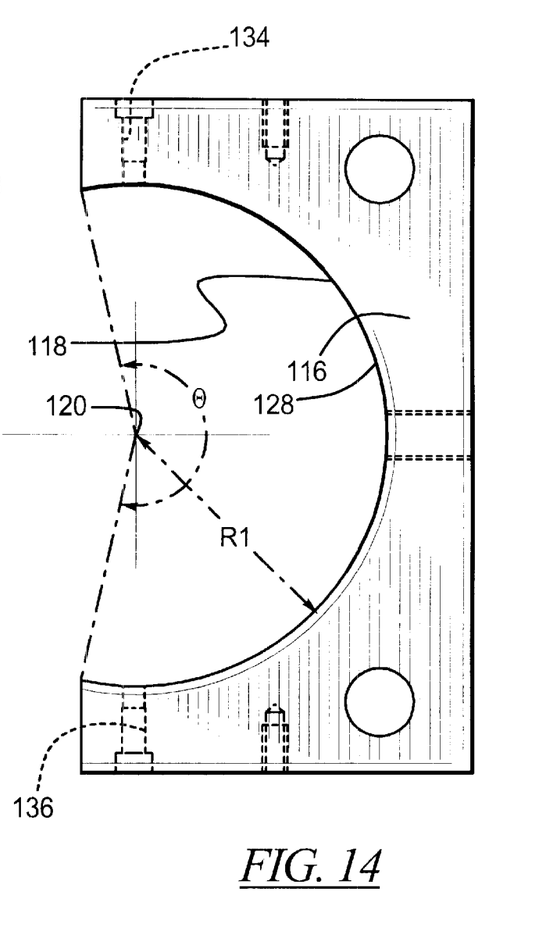
FIG. 14 is an enlarged, front elevation view of the bearing housing in FIG. 13.
Figure 15:
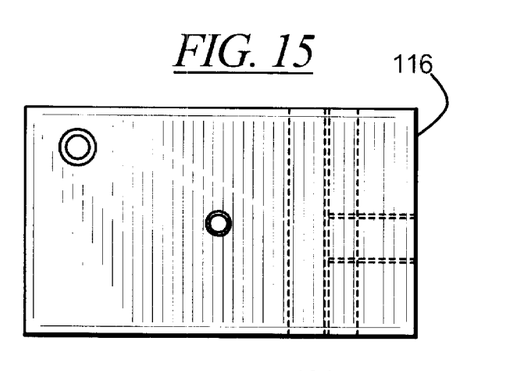
FIG. 15 is an enlarged, plan view of the bearing housing in FIGS. 13 and 14.

The first bearing assembly 112 further consists of a first, D-shaped carrier 122 having a convex, arcuate guide surface 124 defined by a radius R2 from a center 126, which radius R2 is slightly less than the radius R1 of the guide surface 118 on the bearing housing 116. The surface 124 extends through an angle θ2 that is slightly greater than the angle θ1.

The carrier 122 has a thickness T that is approximately the same as the thickness T1 of the bearing housing 116. With this construction, the carrier 122 can nest in the complementarily-shaped opening 128 defined by the bearing housing 116 so that the centers 120, 126 are coincident. With the carrier 122 operatively situated in the opening 128 on the bearing housing 116, the arcuate guide surfaces 118, 124 on the bearing housing 116 and carrier 122 cooperate to guide relative movement between the carrier 122 and bearing housing 116 around an axis 130 extending through the centers 120, 126.

Because the guide surfaces 118, 124 both extend through greater than 180°, the carrier 122 must be directed into the opening 128 by relative movement along the axis 130. The bearing housing 116 and carrier 122 are maintained in their operative position by bolts 132 which are directed through diametrically oppositely located stepped bores 134, 136 through the bearing housing 116. The bores 134, 136 are coaxial, with the axes thereof extending through the center 120. The bolts 132 have a length sufficient to extend through the bores 134, 136 and into the opening 128. To accommodate the bolt ends in the opening 128, the carrier 122 has an undercut guide slot 138 formed at the guide surface 124. The bolts 132 thus limit relative movement along the axis 130 between the bearing housing 116 and carrier 122. With this structure, the bearing housing 116 and carrier 122 are maintained in a position wherein they are relatively pivotable about the fixed axis 130.

In this embodiment, three roller elements 140, 142, 144 are mounted for rotation about fixed pivot axes relative to the carrier 122. The center roller element 142 is pivotable about the axis 130. The roller element 140 is pivotable about an axis 146, with the roller element 144 pivotable about an axis 148. The roller elements 140, 142, 144 have the same construction and are each dimensioned to fit within a U-shaped receptacle 150 having a uniform width portion with a dimension X that is bisected by a plane extending through the axes 146, 148.

The roller elements 140, 142, 144 are each journalled for rotation in the same manner. Exemplary roller element 144 is maintained in place by a bolt 152 which extends through a stepped bore 154 through the carrier 122 and is directed along the axis 148 from one side 156 of the carrier 122, through the bore 157 through the roller element 144, and from the other side 158 of the carrier 122. The head 160 of the bolt 152 seats in an enlarged diameter portion 162 of the bore 154 so as not to project outwardly from the side 156 of the carrier 122. A spacer 164 is seated in a bore portion 166. A nut 168 is threaded to the leading end 170 of the bolt 152 and is tightened so that roller element 144 is captive between facing surfaces 172, 174 bounding the receptacle 150 and maintained for rotation around the central axis 176 of the bolt 152, which axis 176 is coincident with the axis 148. The roller elements 140, 142 are mounted in similar fashion.

The receptacle 150 has a sub-receptacle 178 to provide an enlarged, clearance space, as to accept any foreign material that may have migrated into the receptacle 150. This may prevent buildup of foreign material to an extent that would otherwise impede rotating movement of the roller elements 140, 142, 144.

Figures 8, 9:
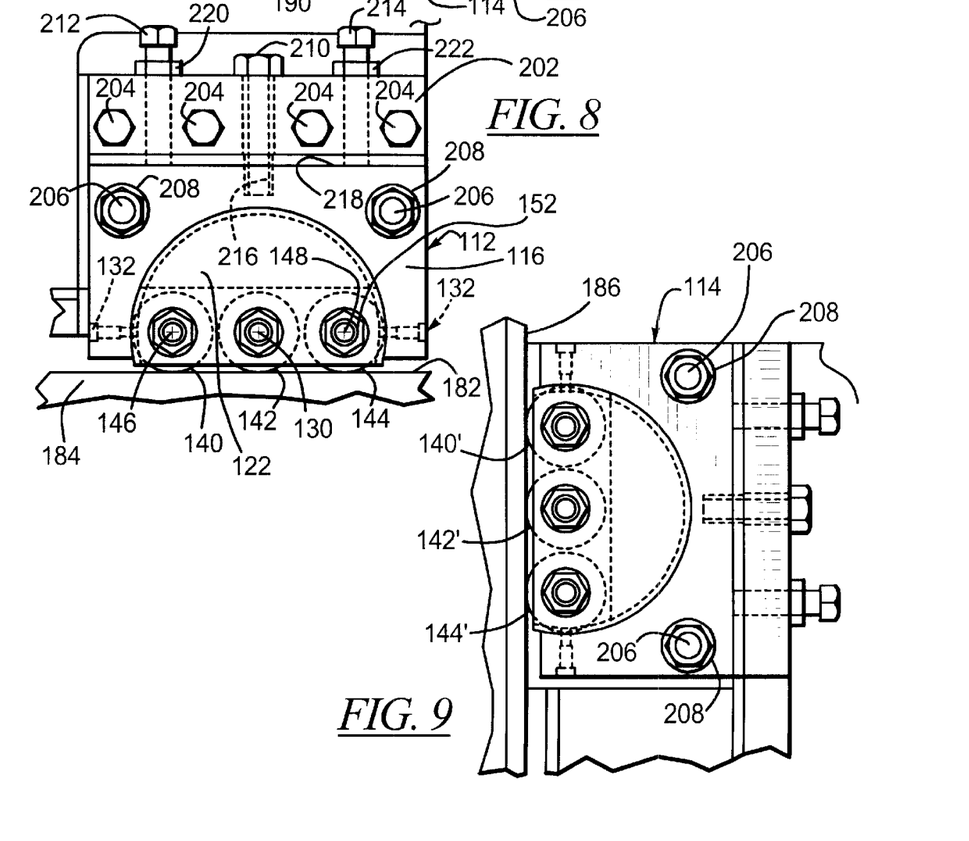
FIG. 8 is an enlarged, side elevation view of one of the bearing assemblies on the guide assembly of FIG. 7.
FIG. 9 is an enlarged, front elevation view of the other bearing assembly on the guide assembly in FIG. 7.

With the bearing assembly 112 assembled, the roller elements 140, 142, 144 project from the receptacle 150 beyond a straight edge 180 on the carrier 122. The edge 180 in turn extends slightly outwardly from the opening 128 in the bearing housing 116.

Figure 7:
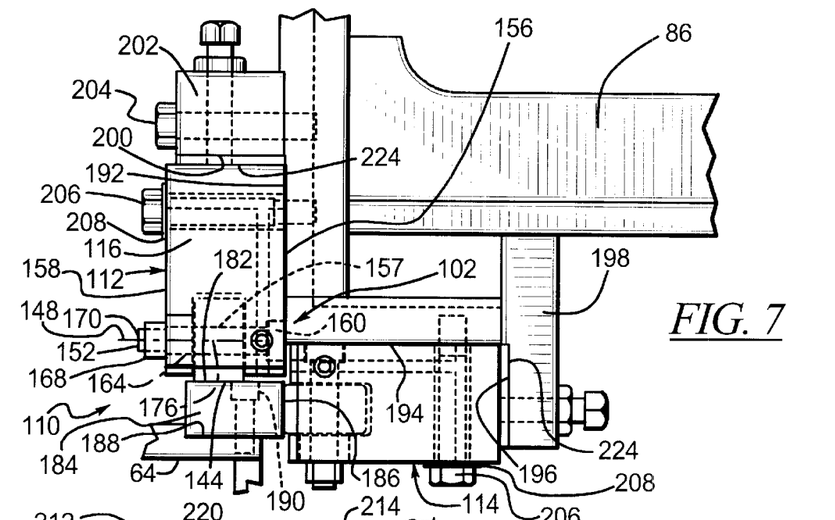
FIG. 7 is an enlarged, fragmentary, plan view of a guide assembly at one corner of the slide element and cooperating with one column on the frame.

The bearing assemblies 112, 114 are mounted to the slide element 86 so that the roller elements 140, 142, 144 roll guidingly against a surface 182 on a track element 184, simultaneously as corresponding roller elements 140', 142', 144' on the second bearing assembly 114 roll against an orthogonal surface 186 on the track element 184. The track element 184 is a hardened piece of squared metal stock that is bolted within a recess 188 on the column 64 and held in place by a series of bolts 190. The track element 184 has a vertical extent sufficient to simultaneously engage the guide assemblies 110 at the column 64 within the full range of movement for the slide element 86.

The bearing assemblies 112, 114 are mounted respectively on outside corner surfaces 192, 194, the planes of which are orthogonal to each other at the corner 102. The second bearing assembly 114 nests in a corner at the juncture between the surface 194 and a transverse surface 196. The transverse surface 196 is defined by a mounting block 198 which is fixed with respect to the slide element 86.

The first bearing assembly 112 nests in a corner defined by the surface 192 and an orthogonal surface 200, with the surface 200 defined by a mounting block 202 that is releasably maintained on the slide element 86 by a plurality of bolts 204.

At initial setup, the mounting block 202 is installed using the bolts 204. The bearing assemblies 112, 114 are preassembled. The bearing housing 116 is secured to the slide element 86 through bolts 206 and washers 208. The second bearing assembly 114 is similarly attached using bolts 206 and washers 208. The bolts 206 are tightened to a point that allows adjusting movement of the bearing assemblies 112, 114 relative to the slide element 86. This adjustment is carried out for the exemplary bearing assembly 112 through a pull adjusting bolt 210 and two push adjusting bolts 212, 214. The adjusting bolts 210, 212, 214 all extend through the mounting block 202 with the pull adjusting bolt 210 extending into a blind bore 216 in the bearing housing 116. The push adjusting bolts 212, 214 bear against an edge 218 of the bearing housing 116. The adjusting bolts 210, 212, 214 are torqued to cause the roller elements 140, 142, 144 to be simultaneously brought into direct contact with the track surface 182. The push adjusting bolts 212, 214 are locked in a desired position by locking nuts 220, 222. The bolts 206 are then tightened to securely maintain the position of the bearing housing 116. The second bearing assembly 114 is installed in a like fashion.

Figure 16:
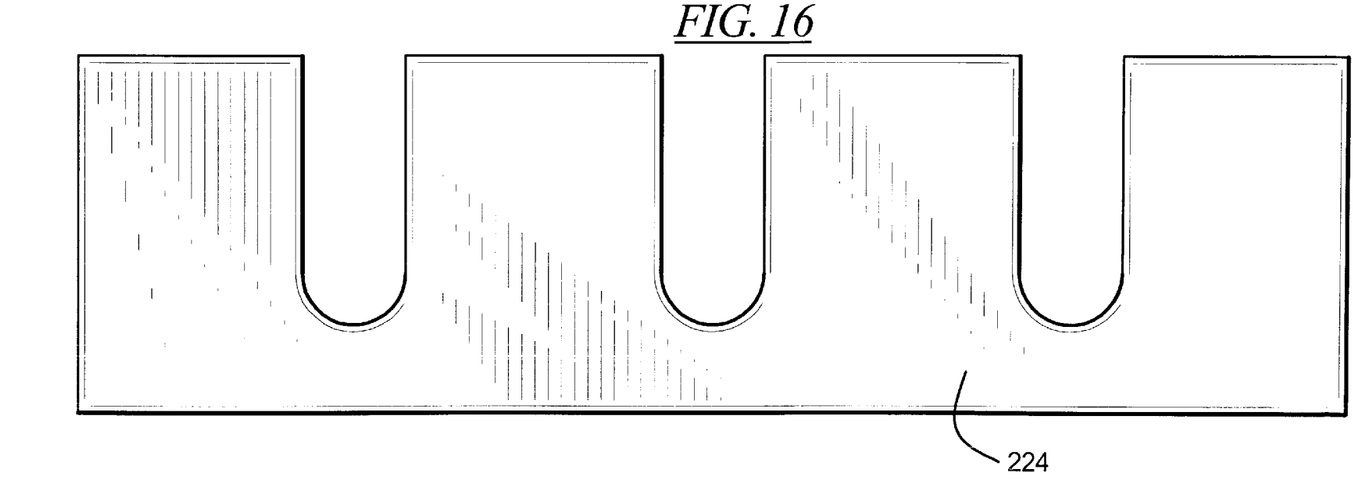
FIG. 16 is an enlarged, plan view of a shim that can be placed against the inventive guide assemblies to effect adjustment thereof relative to the slide element.

The system can then be test run with final adjustments thereafter made to the bearing assemblies 112, 114. After a test run, any clearance between the roller elements 140, 142, 144, 140', 142', 144' and the track element 184 is measured. Shims 224, as shown in FIG. 16, can be ground to the desired thickness of the gap produced after the test run. For exemplary first bearing assembly 112, the push adjusting bolts 212, 214 can be torqued to produce a gap between the mounting block 202 and the bearing housing 116 sufficient to allow the shims 224 to be placed therebetween. A similar shim fitting is carried out for the second bearing assembly 114.

Once the system is set up, the guide assemblies 110 will cooperatively guide smooth relative movement between the slide element 86 and frame 62 at all corners of the slide element 86. In the event that there is any skewing of the slide elements 86, the carriers 122 pivot to maintain contact of all three roller elements 140, 142, 144, 140', 142', 144' with the track elements 184. Accordingly, the skewing forces may be borne at all times by the roller elements on all the guide assemblies 110. The transverse relationship of the bearing assemblies 112, 114 on each guide assembly 110 prevents skewing of the slide element 86 relative to the frame 62 in all directions, i.e. in multiple planes.

Figure 17:
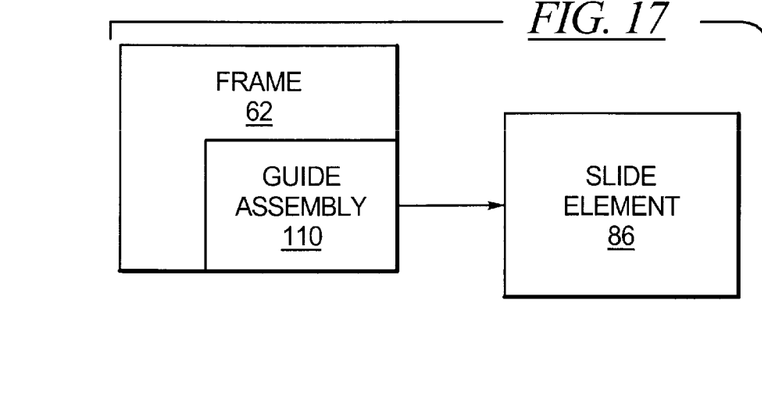
FIG. 17 is a schematic representation of one variation of press system, according to the invention, wherein the slide element is movable horizontally relative to the frame.

Variations from the press system 60 shown are contemplated. As shown schematically in FIG. 17, the guide assemblies 110 can be provided on the frame 62 rather than on the slide element 86. In this embodiment, the slide element 86 is movable horizontally between the extended and retracted positions.

Figure 18:
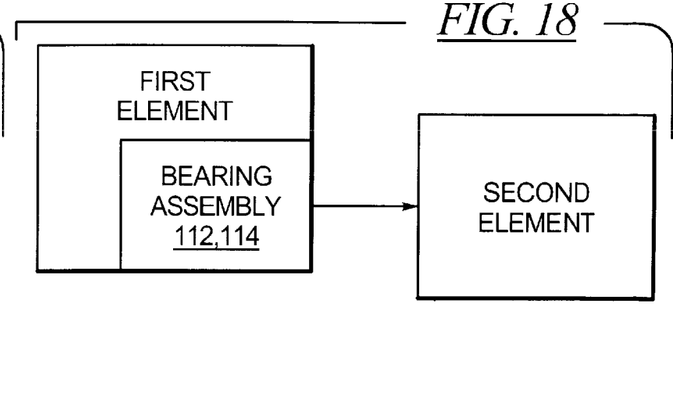
FIG. 18 is a generic representation of the inventive system used to guide any two elements relative to each other.

In FIG. 18 another variation is shown wherein the bearing assemblies 112, 114 are mounted on a first element to act between the first element and a second element as the first and second elements are relatively moved. The environment in FIG. 18 may be a non-press environment wherein any two elements are to be guided in movement, one relative to the other.

The foregoing disclosure of specific embodiments is intended to be illustrative of the broad concepts comprehended by the invention.

What is claimed is:

1. A press system comprising:
   a frame comprising at least one elongate column;
   a side element that is guided by the at least one column between a retracted position and an extended position; and
   a first guide assembly acting between the slide element and the one column,
   the first guide assembly comprising a) a first bearing assembly comprising a first bearing housing on one of the slide element and the one column, a first carrier that is guidingly movable relative to the first bearing housing around a first axis as the slide element moves between the extended and retracted positions, a first roller element that is mounted on and guidingly movable relative to the first carrier around a second axis and a second roller element that is mounted on and guidingly movable relative to the first carrier around a third axis, the first and second roller elements acting against a first surface on the other of the slide element and the one column to guide movement between the slide element and frame as the slide element is moved between the retracted and extended position, and b) a second bearing assembly acting between the slide element and frame so as to guide relative movement between the slide element and frame, the second bearing assembly comprising a second housing, a second carrier that is guidingly movable relative to the second bearing housing, and a third roller element that is movable guidingly relative to the second carrier.

2. The press system according to claim 1 wherein the first and second surfaces are transverse to each other.

3. The press system according to claim 1 wherein the second carrier is guidingly movable relative to the second bearing housing around a fourth axis.

4. The press system according to claim 3 wherein the fourth axis is traverse to the first axis.

5. The press system according to claim 1 wherein the first, second and third axes are substantially parallel to each other.

6. The press system according to claim 1 wherein there is at least one roller element on the second bearing assembly in addition to the third roller element that is movable guidingly relative to the second carrier and acts against a surface on one of the slide element and frame to guide movement between the slide element and frame as the slide element is moved between the retracted and extended positions.

7. The press system according to claim 4 wherein the press element is movable in substantially a first straight line between the extended and retracted positions and the first and fourth axes are substantially orthogonal to the first straight line.

8. The press system according to claim 1 wherein the first axis is substantially fixed relative to the first carrier.

9. The press system according to claim 1 wherein the frame comprises three elongate columns in addition to the one elongate column and there is a guide assembly, the same as the first guide assembly, acting between the slide element and each of the three columns in addition to the one column.

10. The press system according to claim 1 wherein there is a third guide assembly, the same as the first guide assembly, acting between the slide element and the one column.

11. A press system comprising:
    a frame;
    a slide element that is guided by the frame between a retracted position and an extended position; and
    a first bearing assembly acting between the slide element and the frame, the first bearing assembly comprising a first bearing housing on one of the slide element and the frame, a first carrier that is connected to the first bearing housing for pivoting movement relative to the first bearing housing around a substantially fixed first axis as the slide element moves between the extended and retracted positions, a first roller element that is connected to the first carrier for pivoting movement relative to the first carrier around a second substantially fixed axis, and a second roller element that is connected to the first carrier for pivoting movement relative to the first carrier around a third axis that is substantially parallel to the first axis, the first and second roller elements acting against a first surface on the other of the slide element and the frame to guide movement between the slide element and frame as the slide element is moved between the retracted and extended positions.

12. The press system according to claim 11 wherein the first carrier has an arcuate, concave surface which guides the first bearing housing in pivoting movement around the first axis.

13. The press system according to claim 11 wherein the first bearing housing is fixedly attached to the one of the slide element and frame.

14. The press system according to claim 11 further comprising a first mounting block releasably attached to the one of the slide element and frame wherein the first bearing housing is attached to the first mounting block so that the first bearing housing can be adjusted and maintained in a desired position relative to the first mounting block.

15. The press system according to claim 14 further comprising a second bearing assembly that is the same as the first bearing assembly and comprising a second bearing housing, the press system further comprising a second mounting block that is in a fixed position on the one of the slide element and frame wherein the second bearing housing is attached to the second mounting block so that the second bearing housing can be adjusted and maintained in a desired position relative to the second mounting block.

16. The press system according to claim 15 wherein the slide element comprises first and second transverse surfaces, the first mounting block is attached to the first transverse surface and the second mounting block is attached to the second transverse surface.

17. A method of guiding relative movement between a slide element and a frame on a press system, the frame comprising at least three elongate columns which are located around a space within which the slide element is movable between an extended position and a retracted position, the method comprising the steps of:

provide a plurality of bearing assemblies that cooperate one each between the slide element and each elongate column;

rotating a plurality of roller elements on a carrier on each bearing assembly around substantially parallel axes and against one of a) the slide element and b) one of the columns to guide relative movement between the slide element and frame as the slide element moves between the extended and retracted positions; and repositioning the carrier on one of the bearing assemblies as the slide element moves between the extended and retracted positions to permit the plurality of rollers on the carrier on the one bearing assembly to be borne against one of the slide element and frame.

18. The method according to claim 17 wherein a plurality of the roller elements are mounted upon a first carrier that is pivotable relative to a part of one of a) the slide element and b) one of the columns and further comprising the step of varying the orientation of the first carrier relative to the part of the one a) the slide element and b) one of the columns to accommodate skewing of the slide element as the slide element is moved between the extended and retracted positions.

19. A press system comprising:

a frame;

a slide element that is guided by the frame between a retracted position and an extended position; and a first bearing assembly on the slide element, the first bearing assembly comprising a first carrier that is pivotable relative to the slide element around a first substantially fixed axis as the slide element moves between the extended and retracted positions and first and second roller elements that are connected to the first carrier for pivoting movement relative to the first carrier around second and third axes that are substantially parallel to the first axis for acting against the other of the slide element and frame to guide movement between the slide element and frame as the slide element is moved between the retracted and extended position.

20. A press system comprising:

a frame;

a slide element that is guided by the frame between a retracted position and an extended position; and a bearing assembly acting between the slide element and the frame, the bearing assembly comprising a bearing housing on one of the slide element and the frame, a carrier that is connected to the bearing housing for pivoting movement relative to the bearing housing around a substantially fixed first axis, and a roller element that is connected to the carrier for pivoting movement relative to the carrier around a second substantially fixed axis and acts against a flat surface on the other of the slide element and the frame to guide movement between the slide element and frame as the slide element is moved between the retracted and extended positions, wherein the carrier has an arcuate, concave surface which guides the bearing housing in pivoting movement around the first axis.

21. A press system comprising:

a frame;

a slide element that is guided by the frame between a retracted position and an extended position;

a first bearing assembly acting between the slide element and the frame, the first bearing assembly comprising a first bearing housing on one of the slide element and the frame, a first carrier that is connected to the first bearing housing for pivoting movement relative to the first bearing housing around a substantially fixed first axis, and a first roller element that is connected to the first carrier for pivoting movement relative to the first carrier around a second substantially fixed axis and acts against a first surface on the other of the slide element and the frame to guide movement between the slide element and frame as the slide element is moved between the retracted and extended positions; and a first mounting block releasably attached to the one of the slide element and frame, wherein the first bearing housing is attached to the first mounting block so that the first bearing housing can be adjusted and maintained in a desired position relative to the first mounting block.

22. The press system according to claim 21 further comprising a second bearing assembly that is the same as the first bearing assembly and comprising a second bearing housing, the press system further comprising a second mounting block that is in a fixed position on the one of the slide and frame wherein the second bearing housing is attached to the second mounting block so that the second bearing housing can be adjusted and maintained in a desired position relative to the second mounting block.

23. The press system according to claim 22 wherein the slide element comprises first and second transverse surfaces, the first mounting block is attached to the first transverse surface and the second mounting block is attached to the second transverse surface.

* * * * *